July 13, 1926.
A. W. OLDS
1,592,220
MEANS FOR OPERATING VEHICLE SPEED SIGNALS
Filed Nov. 1, 1924
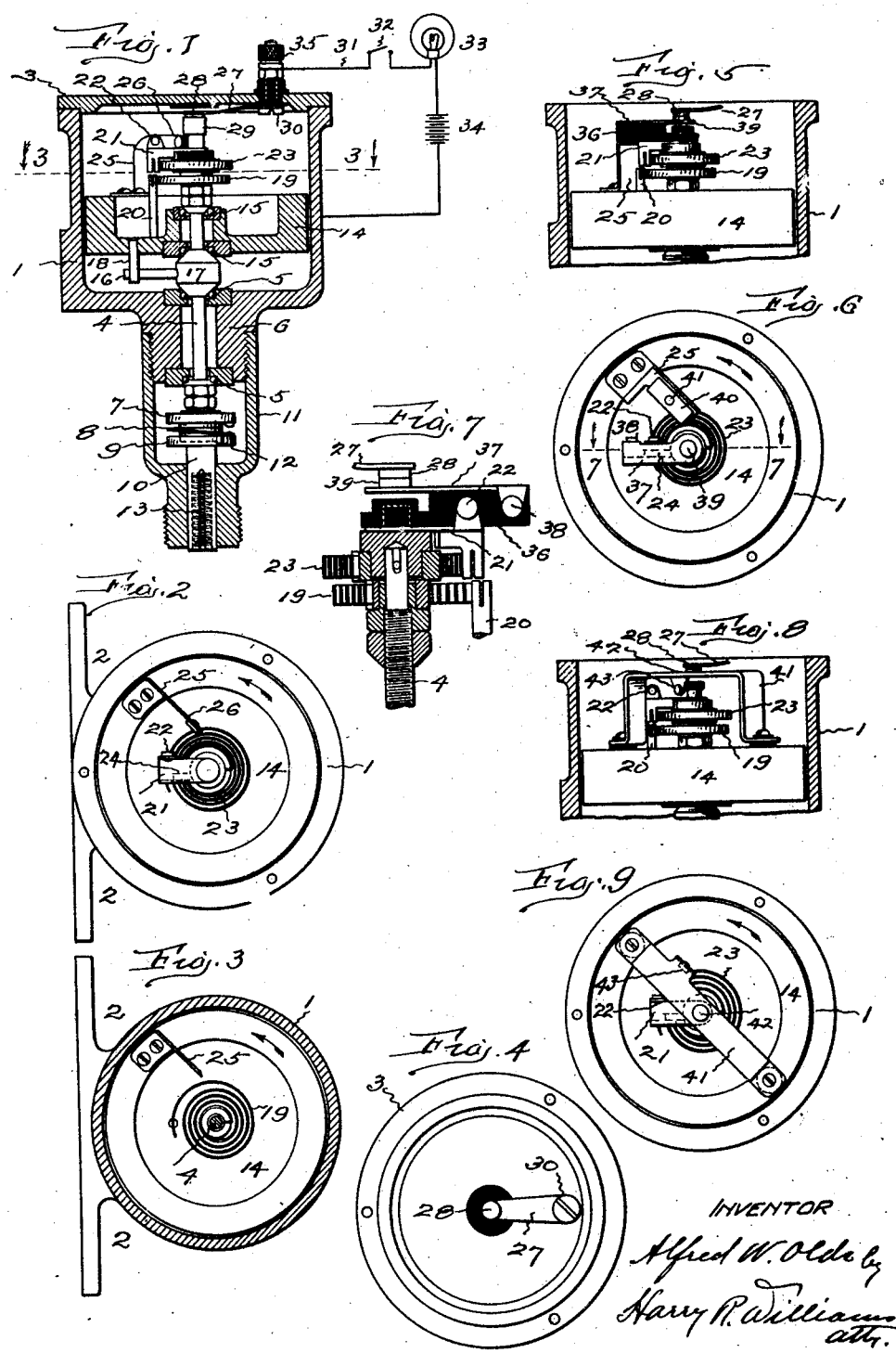
INVENTOR
Alfred W. Olds by
Harry R. Williams
atty.

Patented July 13, 1926.

1,592,220

UNITED STATES PATENT OFFICE.

ALFRED W. OLDS, OF WINDSOR, CONNECTICUT.

MEANS FOR OPERATING VEHICLE-SPEED SIGNALS.

Application filed November 1, 1924. Serial No. 747,217.

This invention relates to apparatus designed to be applied to pleasure and commercial automobiles for automatically causing a light, sign or other warning signal to indicate change in the rate of travel of the vehicle.

The object of the invention is to provide an effective and sensitive apparatus of this character which can be readily applied to an automobile and connected with a rotating part of the vehicle so as to act in consonance therewith, and be connected in an electric circuit which includes a light, sign or other warning signal, in such manner that when the vehicle is traveling at a uniform speed or at an increasing speed the circuit will be open, but at all times, no matter at what rate the vehicle is traveling, when speed is lowered the circuit will be closed and the light, sign or signal light give warning of the reduction of speed.

In the embodiments of the invention illustrated there is a spindle which is designed to be connected with and rotated by some rotating element of the vehicle, a weighted member or wheel rotatably mounted on the spindle, with a connection between these which drives the wheel forward with the spindle but permits the wheel under its momentum to run faster than the spindle when the speed of the latter is retarded, and means whereby when the spindle rotates slower than the wheel an electrical connection is made through the structure and the signal circuit is closed; while when the spindle and wheel are idle or are rotating at the same speed the electrical connection is open, the contacting parts being so arranged and engaged that there is no retarding friction or drag on the wheel, thereby ensuring sensitiveness of the device to changes in the rate of speed of the vehicle to which it is attached.

In the accompanying drawings Fig. 1 shows an elevation, with the casing and wheel in central section, of one form of device which embodies the invention. Fig. 2 shows a plan of the same with the cover removed. Fig. 3 shows a transverse section on the plane indicated by the dotted line 3—3 on Fig. 1. Fig. 4 is a plan of the inside of the cover. Fig. 5 shows an elevation of the operating parts of the device with the electrical contacts arranged in a different manner. Fig. 6 shows a plan of the parts shown in Fig. 5. Fig. 7, on larger scale, shows an elevation, with parts in section on plane 7—7 on Fig. 6, of the connections of the form shown in Fig. 5. Fig. 8 shows a side view of another modification. Fig. 9 shows a plan of the form shown in Fig. 8.

The device illustrated is enclosed in a cylindrical casing 1 that is provided with ears 2 by means of which it may be attached to the vehicle and with a cover 3 which may be removed to permit access to the interior. A spindle 4 is mounted to turn freely on anti-friction bearings 5 set in the hub 6 that projects from the casing. On the lower end of the spindle is a metallic head 7 and adapted to engage with this is a curved leaf spring 8 which is attached to a head 9 on the arbor 10, rotatably mounted in the cap 11 which is screwed onto the hub to protect these parts. By these means an electrical connection is made between the head on the spindle and the head on the arbor. Set in the head on the arbor is a friction washer 12, preferably of cork. A spring 13 is arranged in the arbor in such manner as to tend to press up the arbor and force the cork washer against the head of the spindle when the arbor is connected to the driving shaft and ensure such frictional engagement that the rotation of the arbor will cause the rotation of the spindle, although any sudden movement of either part will permit the parts in frictional engagement to slip and relieve the device of shock. Any suitable means may be coupled to the arbor for the purpose of driving it.

Rotatably mounted on the spindle is a wheel 14 there being anti-friction bearings 15 between the wheel and the spindle. In the construction shown there is a pin 16 projecting radially from the bearing cone 17 that is fastened to the spindle, and this pin is adapted to engage a stud 18 projecting downward from the wheel in such relation that when the spindle is rotated forwardly the pin engages the stud and drives the wheel, but leaves the wheel free to turn ahead of the spindle one revolution.

A coiled spring 19 has one end connected with the spindle and its other end fastened to a stud 20 projecting from the wheel. This spring is arranged to yieldingly hold the wheel in such relation to the spindle that the pin 16 is normally engaged with the stud 18. The spring is very light and allows the wheel under its momentum to run ahead of the spindle when the speed of rotation of the spindle is slowing down, but returns the wheel to normal driving relation to the spindle when the speed of the wheel is reduced to that of the spindle.

In the form first shown an arm 21 bearing a contact 22 is rotatably mounted on an extension 29 of the spindle which extension rotates with but is insulated from the spindle. This arm is connected with the insulated spindle extension by a light spring 23, the spring which connects the arm with the spindle extension being tensioned to throw the arm rotarily in one direction and the spring which connects the wheel with the spindle being tensioned to rotate the wheel in the same direction, and both reversely to the driving direction of the spindle. A stop pin 24 projects from the spindle extension and is engaged by a part of the arm for limiting the rotary movement of the arm under the impulse of the spring, Fig. 2.

Mounted on the wheel and in electrical connection therewith is an angular arm 25 with a contact 26. Attached to the inside of the cap is a spring finger 27 which at its free end has a contact 28 which is adapted to bear on the end of a piece 29 that turns with but is insulated from the spindle. The other end of the spring finger is fastened to a binding screw 30 that extends through to the outside of the cover from which it is suitably insulated. One terminal of the circuit 31 which includes a switch 32, signal lamp 33 and source of current 34 is connected to the binding post by nut 35, the other end of the circuit being grounded on the instrument or some metallic part to which the instrument is connected.

When the spindle is rotated the pin 16 engages the stud 18 and turns the wheel. As long as the wheel is driven by the spindle the contact 26 carried by the wheel is widely separated from the contact 22 on the spindle and the signal circuit is open. When there is any retardation of the rotation of the spindle, as by a slowing down of the vehicle, the momentum of the wheel carries it ahead and causes the contact 26 on the wheel to engage with the contact 22 on the spindle and close the circuit through the wheel and other elements. The circuit remains closed as long as the wheel runs faster than the spindle. As soon as the rotations of the wheel and spindle become equal, as when the vehicle is running at a uniform speed, or has stopped, the spring 19 which connects the wheel with the spindle returns the wheel so as to open the circuit between the contacts. The spring 23 which connects the arm with the spindle tends to assist this separation of the contacts for when the engagement is made the arm is pushed ahead slightly so that the tension of its spring is increased. With this construction the wheel is practically free to respond to variations in the speed of rotation of the spindle. It is very sensitive as the contacting spring finger on the cover, to which one circuit terminal is connected, bears directly upon a part at the end of the spindle and offers no resistance to the rotation of the wheel. The only resistance the wheel is obliged to overcome is that incident to the friction of its ball bearings and the slight opposition of the small spring which connects it with the spindle and tends to return it and break the contact.

In the form illustrated in Figs. 5, 6 and 7 the essential elements and their co-operation are practically the same as above described, the only difference being in the arrangement of the contacts carried by the spindle and by the wheel. In this case the arm 21 with contact 22 which is rotatably mounted on the end of the spindle and is connected thereto by the spring 23 carries a block of insulation 36. Fastened to the upper side of the insulating block is a conducting plate 37 provided with a contact 38 that extends into the plane of the contact 22. The contacts 22 and 38 are thus normally insulated from each other. The plate 37 also has a contact 39 in axial alignment with the spindle and upon this bears the contact 28 on the end of the spring finger 27 attached to the cover. For the purpose of connecting the contacts 22 and 38 the arm 25 attached to the wheel is provided with a conducting piece 40 preferably pivoted thereto by a stud 41. When the spindle and wheel are rotating at the same speed the contact piece 40 carried by the wheel is separated from the contacts 22 and 38 at the end of the spindle. As soon as the speed of the spindle is retarded with relation to that of the wheel the latter due to its momentum overcomes the resistance of its spring 19 and runs ahead so that the contact 40 engages and connects the contacts 22 and 38, thus closing the circuit through the parts from the spring finger 27 on the cover to the spindle which is grounded. When the rotation of speed of the spindle and wheel again become the same or when the vehicle stops the spring 19 returns the wheel and opens the circuit. With this arrangement the wheel is very sensitive to differences in the speed of rotation of the spindle as there is no drag upon it, the only resistance offered being that of the bearings and the light spring which connects it with the spindle.

In the modification illustrated in Figs. 8 and 9 a bridge piece 41 is mounted on and insulated from the wheel and the contact 28 on the spring finger 27 attached to the cover engages the contact 42 on the bridge in axial alignment with the spindle. The bridge also has a contact 43 that extends downward into the plane of the contact 22 on the arm 21 that is rotatably mounted on the spindle and is connected thereto by the spring 23, as in the previously described forms. In this case the arm 21 is in electrical connection with the spindle. When the spindle and wheel are rotating at the same speed contacts 22 and 42 are separate but as the speed of the spindle is retarded and the wheel runs ahead these contacts engage and the circuit is closed from the spring finger attached to the cover through the bridge and contacts to the spindle.

In all of the forms the contacts are normally widely separated but are brought together by the momentum of the wheel when the spindle is retarded by the slowing down of the vehicles to which the devices are applied. There being no drag the movements of the wheel are very sensitive, and the springs arranged as described open the circuit quickly when the wheel and spindle are rotating at the same speeds or stop. After being originally set no adjustment of the parts is required and owing to the yielding of the springs the contacts are made without shock or rebound.

The invention claimed is:

1. Means for operating an automobile speed signal comprising a rotary spindle adapted to be driven from the vehicle, an electrical contact arm rotatably mounted on and yieldingly connected with the spindle, whereby the contact rotates with the spindle but is capable of yielding forwardly with relation to the forward rotation of the spindle, a weighted member rotatably mounted on the spindle and adapted to be driven forwardly by the spindle but free to rotate ahead of the spindle, an electrical contact arm mounted on the weighted member, and a spring yieldingly connecting the weighted member with the spindle, said parts being so related that the contact arms on the spindle and on the weighted member are separated when the weighted member is being driven by and is rotating at the same speed as the spindle but the contact on the weighted member is caused to engage and push ahead the contact on the spindle when the speed of the spindle is retarded and the weighted member runs ahead due to its momentum.

2. Means for operating an automobile speed signal comprising a rotary spindle adapted to be driven from the vehicle, an electrical contact loosely mounted on and rotatable about the axis of the spindle, a spring yieldingly connecting said contact with the spindle, a weighted member rotatably mounted on the spindle and adapted to be driven forwardly by the spindle but free to rotate ahead of the spindle, an electrical contact mounted on the weighted member, and a spring yieldingly connecting the weighted member with the spindle, said parts being so related that the contacts in the spindle and on the weighted member are separated when the weighted member is being driven by and is rotating at the same speed as the spindle but the contacts are caused to engage when the speed of the spindle is retarded and the weighted member runs ahead due to its momentum.

3. Means for operating an automobile speed signal comprising a rotary spindle adapted to be driven from the vehicle, an electrical contact loosely mounted on and rotatable about the axis of the spindle, a weighted member rotatably mounted on the spindle and adapted to be driven forwardly by the spindle but free to rotate ahead of the spindle, an electrical contact mounted on the weighted member and extending into the plane of the first mentioned contact, and a spring yieldingly connecting the weighted member with the spindle, said contact on the spindle and on the weighted member being located in the same plane of rotation whereby when the weighted member is rotated at a faster speed than the spindle the contacts are caused to come together with a rotary engagement.

4. Means for operating an automobile speed signal comprising a rotary spindle adapted to be driven from the vehicle, an electrical contact loosely mounted on and rotatable about the axis of the spindle, a spring yieldingly connecting said contact with the spindle, a weighted member rotatably mounted on the spindle and adapted to be driven forwardly by the spindle but free to rotate ahead of the spindle, an electrical contact mounted on the weighted member, and a spring yieldingly connecting the weighted member with the spindle, said parts being so related that the contact on the weighted member engages the contact on the spindle and pushes it ahead against its spring when the weighted member is rotated at a greater speed than the spindle.

5. Means for operating an automobile speed signal comprising a rotary spindle adapted to be driven from the vehicle, an electrical contact loosely mounted on and rotatable about the axis of the spindle, a weighted member rotatably mounted on the spindle and adapted to be driven forwardly by the spindle but free to rotate ahead of the spindle, an electrical contact mounted on the weighted member, a spring yieldingly connecting the first mentioned contact with the spindle, and a spring yieldingly connecting the weighted member with the spindle, said springs being tensioned to rotate the weighted member and contacts backward, and said contacts on the spindle and on the weighted member being so related that they are separated when the weighted member is being driven forward by and is rotating at the same speed as the spindle but the contacts are caused to engage when the speed of the spindle is retarded and the weighted member runs ahead due to its momentum.

6. Means for operating an automobile speed signal comprising a rotary spindle adapted to be driven from the vehicle, a fixed conducting finger with a contact in axial alignment with the spindle, a contact loosely mounted on and rotatable about the axis of the spindle, and in electrical connection with the contact on the finger, a spring yieldingly connecting said rotatable contact with the spindle, a weighted member rotatably mounted on the spindle and adapted to be driven forwardly by the spindle but free to rotate ahead of the spindle, an electrical contact mounted on the weighted member, and a spring yieldingly connecting the weighted member with the spindle, said parts being so related that the contacts on the spindle and on the weighted member are separated when the weighted member is being driven by and is rotating at the same speed as the spindle but the contacts are caused to engage when the speed of the spindle is retarded and the weighted member runs ahead due to it momentum.

ALFRED W. OLDS.